US012096845B2

(12) United States Patent
Piesker et al.

(10) Patent No.: US 12,096,845 B2
(45) Date of Patent: Sep. 24, 2024

(54) INTERFACE FOR ATTACHING A BRUSH TO A SKIN TREATMENT DEVICE

(71) Applicant: Braun GmbH, Kronberg (DE)

(72) Inventors: Thorsten Piesker, Friedrichsdorf (DE); Xinwu Lai, Singapore (SG); Tiandong Guo, Beijing (CN)

(73) Assignee: Braun GmbH, Kronberg (DE)

( * ) Notice: Subject to any disclaimer, the term of this patent is extended or adjusted under 35 U.S.C. 154(b) by 826 days.

(21) Appl. No.: 17/034,475

(22) Filed: Sep. 28, 2020

(65) Prior Publication Data

US 2022/0095779 A1 Mar. 31, 2022

Related U.S. Application Data

(63) Continuation of application No. PCT/CN2018/080521, filed on Mar. 26, 2018.

(51) Int. Cl.

| | |
|---|---|
| ***A46B 13/02*** | (2006.01) |
| ***A45D 44/00*** | (2006.01) |
| ***A46B 9/08*** | (2006.01) |
| ***A46B 13/00*** | (2006.01) |
| ***A47K 7/04*** | (2006.01) |
| ***B26B 19/38*** | (2006.01) |

(52) U.S. Cl.

CPC .............. *A46B 13/02* (2013.01); *A45D 44/00* (2013.01); *A46B 9/08* (2013.01); *A46B 13/008* (2013.01); *A46B 13/023* (2013.01); *A47K 7/04* (2013.01); *B26B 19/3813* (2013.01); *B26B 19/386* (2013.01); *A46B 2200/1006* (2013.01)

(58) Field of Classification Search

CPC ....... A46B 13/02; A46B 13/008; A46B 13/23; A46B 9/08; A45D 44/00; A47K 7/04

See application file for complete search history.

(56) References Cited

U.S. PATENT DOCUMENTS

| | | |
|---|---|---|
| 3,138,866 A | 6/1964 | Lloyd |
| 3,590,482 A | 7/1971 | Carr |
| 3,748,732 A | 7/1973 | Frantz et al. |

(Continued)

FOREIGN PATENT DOCUMENTS

| | | |
|---|---|---|
| CN | 2497943 Y | 7/2002 |
| CN | 2834822 Y | 11/2006 |

(Continued)

OTHER PUBLICATIONS

PCT Supplementary International Search Report and Written Opinion for PCT/CN2018/080521 dated Jul. 14, 2020, 7 pages.

(Continued)

*Primary Examiner* — Shay Karls

(57) ABSTRACT

The present invention is concerned with a skin treatment device and an interface for, preferably detachably, attaching a brush to a skin treatment device, wherein the skin treatment device comprises a drive unit, a component part driven by the drive unit to perform a rotatory and/or oscillating movement and a hood at least partially encasing said driven component part. One of said brush and said driven component part comprises at least two protrusions which both extend through openings in the hood when the brush is attached to the skin treatment device. At least one of said protrusions engages the other of said brush and said driven component part by snap fit when the brush is attached to the skin treatment device.

16 Claims, 7 Drawing Sheets

(56) References Cited

U.S. PATENT DOCUMENTS

| | | | |
|---|---|---|---|
| 3,781,990 | A | 1/1974 | Loner |
| 4,285,041 | A | 8/1981 | Smith |
| 4,594,777 | A | 6/1986 | Kimoto et al. |
| 4,835,453 | A | 5/1989 | Munning et al. |
| 5,240,107 | A | 8/1993 | Casale |
| 5,347,715 | A | 9/1994 | Friedland |
| 5,789,901 | A | 8/1998 | Lomholt |
| 5,801,637 | A | 9/1998 | Lomholt |
| 5,894,670 | A | 4/1999 | Iso et al. |
| 5,920,988 | A | 7/1999 | Momose |
| 6,131,288 | A | 10/2000 | Westerhof et al. |
| 6,189,215 | B1 | 2/2001 | Beerwerth et al. |
| 6,233,535 | B1 | 5/2001 | Petretty |
| 6,305,083 | B1 | 10/2001 | Rijken et al. |
| 6,313,612 | B1 | 11/2001 | Honda et al. |
| 6,326,884 | B1 | 12/2001 | Wohlrabe |
| 6,378,210 | B1 | 4/2002 | Bickford |
| 6,513,532 | B2 | 2/2003 | Mault et al. |
| 6,611,780 | B2 | 8/2003 | Lundell et al. |
| 6,757,182 | B2 | 6/2004 | Smidt et al. |
| RE38,634 | E | 10/2004 | Westerhof et al. |
| 6,853,308 | B1 | 2/2005 | Dustin |
| 7,306,366 | B1 | 12/2007 | Camenzind et al. |
| 7,386,906 | B2 | 6/2008 | Roth et al. |
| 7,498,526 | B2 | 3/2009 | Lohr et al. |
| 7,877,880 | B2 | 2/2011 | Royle |
| 8,109,001 | B2 | 2/2012 | Royle et al. |
| 8,122,061 | B1 | 2/2012 | Guinness |
| 8,141,253 | B2 | 3/2012 | Royle |
| 8,186,063 | B2 | 5/2012 | Clarke |
| 8,627,573 | B2 | 1/2014 | Kraus et al. |
| 8,821,421 | B2 | 9/2014 | Imboden et al. |
| 8,857,063 | B2 | 10/2014 | Koike |
| 8,938,884 | B2 | 1/2015 | Kammer |
| 8,955,228 | B2 | 2/2015 | Eichhorn et al. |
| 10,114,354 | B2 | 10/2018 | Simeth et al. |
| 10,421,203 | B2 | 9/2019 | Perez Lopez et al. |
| 2003/0115694 | A1 | 6/2003 | Pace |
| 2003/0131480 | A1 | 7/2003 | Leung et al. |
| 2005/0028371 | A1 | 2/2005 | Kakimoto |
| 2005/0144784 | A1 | 7/2005 | Ibuki et al. |
| 2005/0177139 | A1 | 8/2005 | Yamazaki et al. |
| 2007/0142845 | A1 | 6/2007 | Akridge et al. |
| 2007/0261185 | A1 | 11/2007 | Guney et al. |
| 2007/0283565 | A1 | 12/2007 | Ho |
| 2008/0163495 | A1 | 7/2008 | Smal |
| 2008/0196258 | A1 | 8/2008 | Kraus |
| 2009/0000126 | A1 | 1/2009 | Kraus |
| 2009/0172948 | A1 | 7/2009 | Kitamura |
| 2010/0085017 | A1 | 4/2010 | Heeringa et al. |
| 2010/0191404 | A1 | 7/2010 | Ishikawa et al. |
| 2010/0269276 | A1 | 10/2010 | Faranda et al. |
| 2011/0010876 | A1 | 1/2011 | Iwahori et al. |
| 2011/0314677 | A1 | 12/2011 | Meier et al. |
| 2012/0192436 | A1 | 8/2012 | Toy |
| 2013/0023901 | A1 | 1/2013 | Sanchez-martinez et al. |
| 2013/0125326 | A1 | 5/2013 | Schmid et al. |
| 2014/0269832 | A1 | 9/2014 | Thrush |
| 2015/0205279 | A1 | 7/2015 | Simeth |
| 2015/0216294 | A1 | 8/2015 | Mongan et al. |
| 2015/0246454 | A1 | 9/2015 | Mintz et al. |
| 2015/0333982 | A1 | 11/2015 | Kang et al. |
| 2016/0018942 | A1 | 1/2016 | Kang et al. |
| 2016/0058659 | A1 | 3/2016 | Angelov |
| 2016/0110907 | A1 | 4/2016 | Kelly et al. |
| 2016/0167241 | A1 | 6/2016 | Goldfarb et al. |
| 2016/0228184 | A1 | 8/2016 | Yang et al. |
| 2016/0270821 | A1 | 9/2016 | Hendler et al. |
| 2016/0307712 | A1 | 10/2016 | Nishimura et al. |
| 2017/0232624 | A1 | 8/2017 | King |
| 2017/0318954 | A1 | 11/2017 | Nishiura et al. |
| 2018/0085942 | A1 | 3/2018 | Perez Lopez et al. |
| 2018/0085943 | A1 | 3/2018 | Bady et al. |
| 2018/0085952 | A1 | 3/2018 | Perez Lopez et al. |
| 2018/0085953 | A1 | 3/2018 | Perez Lopez et al. |
| 2018/0129275 | A1 | 5/2018 | Isomura et al. |
| 2018/0164749 | A1 | 6/2018 | Yuen |
| 2019/0061183 | A1 | 2/2019 | Neyer et al. |
| 2019/0299437 | A1 | 10/2019 | Fuellgrabe et al. |
| 2020/0262092 | A1 | 8/2020 | Perez Lopez et al. |

FOREIGN PATENT DOCUMENTS

| | | | |
|---|---|---|---|
| CN | 201192853 | Y | 2/2009 |
| CN | 203293228 | U | 11/2013 |
| CN | 103600362 | A | 2/2014 |
| CN | 104209965 | A | 12/2014 |
| CN | 204450602 | U | 7/2015 |
| CN | 105313149 | A | 2/2016 |
| CN | 105996869 | A | 10/2016 |
| CN | 107411328 | A | 12/2017 |
| CN | 107440584 | A | 12/2017 |
| DE | 102005003058 | A1 | 7/2006 |
| GB | 1021836 | A | 3/1966 |
| JP | S61134785 | A | 6/1986 |
| JP | H03224590 | A | 10/1991 |
| JP | 2002028383 | A | 1/2002 |
| JP | 2002320399 | A | 10/2002 |
| JP | 2007101509 | A | 4/2007 |
| JP | 2008503325 | A | 2/2008 |
| WO | 2016005142 | A1 | 1/2016 |
| WO | 2016041929 | A1 | 3/2016 |
| WO | 2018060846 | A1 | 4/2018 |

OTHER PUBLICATIONS

All Office Actions, U.S. Appl. No. 15/714,835.
All Office Actions, U.S. Appl. No. 16/834,418.
International Search Report and Written Opinion; Application Ser. No. PCT/CN2018/080521; dated Mar. 4, 2019, 7 pages.

INTERFACE FOR ATTACHING A BRUSH TO A SKIN TREATMENT DEVICE

FIELD OF THE INVENTION

The present invention is concerned with a skin treatment device, in more detail an electrically driven device comprising a brush for skin treatment, for example for skin cleaning and/or oil removal. Further, the present invention is concerned with and an interface for attaching a brush to such a skin treatment device.

BACKGROUND OF THE INVENTION

The use of an electric makeup brush is known for example from EP 2 783 595 A1 for skin treatment. This known device comprises a housing, a detachable brush head with a brush and a gearing mechanism interposed between an electric motor and encased in the housing and the brush.

While the brush itself may be subject to wear and contamination, the more expensive component parts, like the motor, the power source and/or the gearing mechanism, typically have a longer service life. Although many users have several electrically driven devices for skin treatment, including hair removal devices, these devices usually each comprise a motor, a power source and/or a gearing mechanism driving the devices with a different speeds, amplitudes and the like tailored to the individual requirements of the respective device.

It is an object of the present invention to provide a skin treatment device suitable to be used for different applications and permitting replacement of the brush.

SUMMARY OF THE INVENTION

In accordance with one aspect of the present disclosure, an interface for attaching a brush to a skin treatment device is provided, wherein the skin treatment device comprises a drive unit, a component part driven by the drive unit to perform a rotatory and/or oscillating movement and a hood at least partially encasing said driven component part. As an alternative to the rotary movement, the oscillating movement may be a linear movement. The brush may be detachably fastened to said driven component part by at least two protrusions which both extend through openings in the hood when the brush is attached to the skin treatment device. At least one of said protrusions engages the driven component part or the brush by snap fit when the brush is attached to the skin treatment device. For example, the brush may be detachably fastened to said driven component part by at least one lug engaging said driven component part by press fit and additionally by at least one snap element engaging said driven component part by snap fit.

According to a further independent aspect of the present disclosure, a skin treatment device is provided, comprising a shaver handle housing, a detachable brush head pivotably supported by the shaver handle housing about a brush head pivot axis and a gearing mechanism. The shaver handle housing comprises, i.e. encases, a drive unit for driving at least one drive pin in a rotatory oscillating manner with a first amplitude about an oscillation axis which is at least substantially perpendicular to the brush head pivot axis. The brush head comprises a brush rotatable about a brush axis which is at least substantially perpendicular to the brush head pivot axis. The brush may comprise at least one driven element coupled to the at least one drive pin by means of the gearing mechanism. It is preferred that the gearing mechanism translates the rotatory oscillating movement of the drive pin into a rotatory oscillating movement of the driven element of the brush with a second amplitude which is smaller than the first amplitude of the drive pin.

In other words, the skin treatment device mainly comprises the component parts of an electric shaver, wherein the exchangeable cartridge containing one or more cutter units is replaced by the brush head with the gearing mechanism. The gearing mechanism may be integrated into the brush head such that the brush head with the gearing mechanism can be attached to the base components of the electric shaver in a simple manner, for example by means of snap elements. The provision of the gearing mechanism allows translating the movement of the at least one drive pin of the shaver to a different movement of the brush which is adapted to the intended use of the brush for skin treatment.

DETAILED DESCRIPTION OF THE INVENTION

Figure 1:
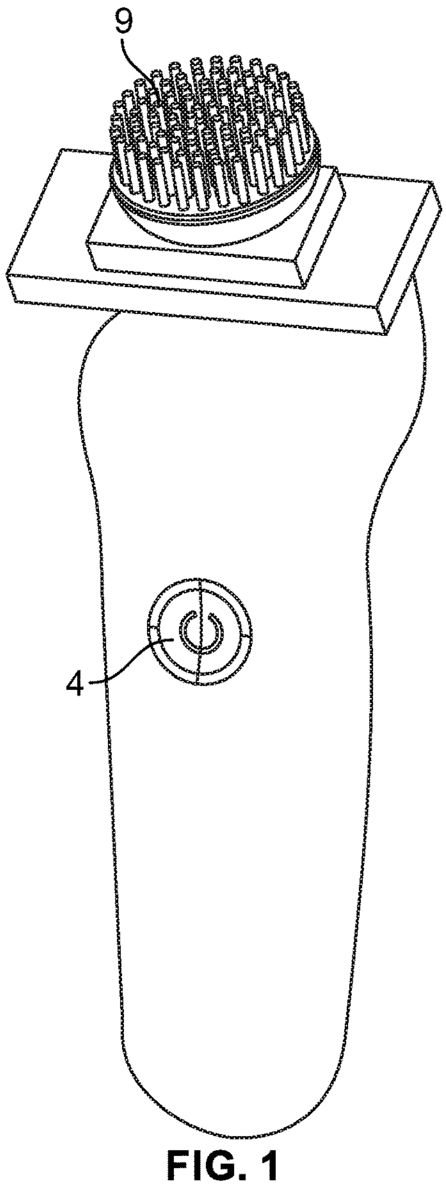
FIG. 1 shows in a schematic perspective view a device according to an embodiment of the invention with attached brush head.

Before describing advantageous embodiments of the invention related to the FIGS. 1 to 15, different aspects of the invention are described more in detail. These aspects disclose further features, advantages and possibilities of use of the present invention that might be combined in any useful combination. All features described and/or shown in the drawings are subject matter of the invention, irrespective of the grouping of the features in the claims and/or their back references.

The protrusions, preferably at least one lug and at least one snap element, may be provided either on the brush or on the driven component part. The protrusions may be identical. However, it is preferred to have at least one lug for transmitting a force or movement and at least one snap element for retaining the brush on the brush head. If the protrusions are provided on the brush, this may contribute to reducing the size of the brush, not requiring space for receiving the protrusions. In addition, this has the benefit that the moving driven component part does not protrude through the hood, i.e. there are no external moving parts if the brush is detached from the brush head.

In electric shavers, especially in electric shavers comprising a foil-type upper cutter und a lower cutter with several blades oscillating relative to the upper cutter, hair removal results may be improved by a relatively large oscillating stroke of the cutter elements relative to each other. For example, in an electric shaver with a foil-type upper cutter und a lower cutter having several blades, a drive pin performs an oscillating movement during use with an amplitude in a range between ±5° and ±10°, for example about ±7.5°, at a relatively high speed in a range between 7,000 rpm and 10,000 rpm, for example about 8,800 rpm. In contrast to that movement of the brush with the above oscillating movement may be undesired in terms of skin sensation and/or splashing of skin treatment products during application. Thus, the gearing mechanism may translate the rotatory oscillating movement of the drive pin into a rotatory oscillating movement of the driven element of the brush with a second amplitude which is smaller than the first amplitude of the drive pin. For example, the second amplitude is smaller than the first amplitude by a factor x, wherein x is between 2 and 15, preferably between 3 and 8. With a transmission ratio from 1/15 to 7/15 the amplitude of the brush may be in a range between ±1° and ±3.5°. Such an amplitude of the movement of the brush is for example suitable for driving a brush having bristles with a diameter of 0.05 mm and the length of 12 to 14 mm.

The gearing mechanism of the skin treatment device may be designed such that the brush axis and the oscillation axis are at least substantially parallel to each other. For example, the brush axis and the oscillation axis may be identical with each other. This may result in a compact design of the brush head and its gearing mechanism.

According to an exemplary embodiment of the present disclosure, the gearing mechanism may comprise a frame, a driving lever pivotably engaging the at least one drive pin, a connection lever pivotably engaging the driving lever and a brush lever pivotably engaging the connection lever and further engaging the at least one driven element of the brush. Preferably, the driving lever, the connection lever and the brush lever are pivotably supported on the frame. With such a design of the gearing mechanism the amplitude of the brush lever may be adapted by varying the distances of the respective rotation axes of the levers from the respective engagement points of the levers with each other.

While the above mentioned embodiment comprises a gearing mechanism with three levers, other designs with more than three levers or less than three levers are suitable for translating the amplitude of the at least one drive pin to a smaller amplitude, too. Providing additional levers may further reduce the second amplitude of the driven element of the brush.

The brush head is preferably a component part which can be attached to the housing of the shaver, thereby replacing a cartridge with cutters. Thus, it is desirable that the interface of the shaver with the cartridge is further suitable for cooperation with the brush head. In this respect it may be beneficial if the frame comprises at least one opening with the at least one drive pin of the shaver extending through the opening in the frame for interaction with one or more further components of the gearing mechanism. The frame may comprise a first stud and a second stud which is offset from the first stud, wherein the driving lever and the brush lever are supported on the first stud and wherein the connection lever is supported on the second stud.

The shaver handle housing with the interface for driving one or more cutter units has at least one drive pin, typically two drive pins for reciprocally driving two cutter units in opposite directions. For such an embodiment, the skin treatment device may comprise two drive pins mounted on a bridge oscillating about the oscillation axis wherein drive pins are located with the same distance from the oscillation axis on the bridge. Although it is sufficient that the driving lever engages only one drive pin, it is preferred if the driving lever pivotably engages both drive pins.

The skin treatment device may comprise an interface for detachably constraining of the gearing mechanism and/or the brush head to the shaver handle housing. Such an interface may comprise one or more snap hooks for attaching the gearing mechanism and/or the brush head on the shaver handle housing. As an example, the frame of the gearing mechanism of the brush head may be provided with two rigid snap arms having hook-like end portions, whereas the shaver handle housing is provided with one or more spring elements which are deflected by the snap arms during attachment of the brush head on the shaver handle housing and interlock with the hook-like end portions of the snap arms, thereby constraining the brush head on the shaver handle housing in a detachable manner.

The gearing mechanism may be an integral part of the brush head such that the brush head may be attached to the shaver handle housing and detached from the shaver handle housing as one unit. For example, the gearing mechanism may be received in a brush hood encasing the driving lever, the connection lever, the brush lever and the frame. Thus, the brush head may consist of the brush hood and the gearing mechanism with the driving lever, the connection lever, the brush lever and the frame. The brush itself may or may not be part of the brush head.

Although the brush is typically a reusable component part, it may be required to replace the brush, while the rest of the device is not replaced. For this purpose, the brush is preferably detachably fastened to the gearing mechanism. In more detail, the brush may comprise at least one snap element for attaching the brush to the brush lever, wherein the brush hood comprises at least one opening permitting engagement of the driven element and/or the at least one snap element of the brush and the brush lever of the gearing mechanism through the opening.

The driven element of the brush may comprise at least one lug engaging a component part of the gearing mechanism, e.g. the brush lever, by press fit, wherein the brush is additionally attached to said component part of the gearing mechanism by snap fit. For example, the brush comprises two snap elements for attaching the brush to the brush lever by snap fit and at least two, e.g. four, lugs for engaging the brush lever by press fit, wherein the snap elements and the lugs are disposed about the brush axis.

The above mentioned connection structure between the brush and brush holder, i.e. the brush head, is designed to transfer movements around an axis without only relying on the friction between brush and brush holder which would occur with pure press fit connections. Thus, driving transmission functions on the one hand and detachment/attachment functions on the other hand may be separated in the proposed design. This contributes to the manufacturability compared with solutions, where a multi-function is integrated to one feature. The connection between brush and brush holder minimizes the relative movements and maximizes the transmission efficiency due to a direct contact using the press fit in the oscillation direction without losing the transmission between driving unit and brush. At the same time the, e.g. hook-shaped, snap elements are a separate feature constraining the brush to the brush head, thereby preventing that the press fit engagement loses contact during operation. Preferably, the snap elements are located closer to the rotary axis of the brush than the lugs. This improves the torque transmission by means of the lugs as they are disposed on a larger diameter compared with the snap elements which mainly retain the brush axially on the brush head.

In addition, the gearing mechanism with its levers is designed to transfer movements around a center shaft, i.e. the brush axis and the oscillation axis, from the driving unit of the shaver handle housing to the brush. The simplified gear chain is designed to adapt the brush attachment for 3D movement, i.e. a movement of the brush head relative to the shaver handle housing about swiveling and/or tilting axes. The directly driving connection between the brush and the brush holder requires only limited space due to the flat levers and the integrated shaft on the frame.

Figure 2:
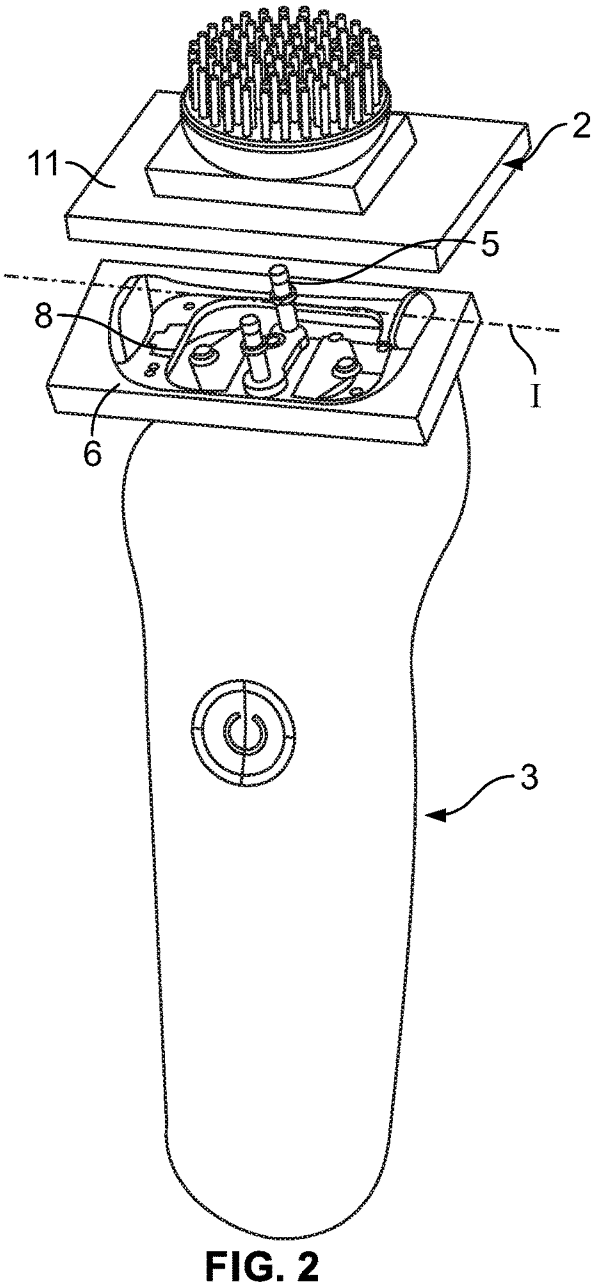
FIG. 2 shows in a schematic perspective view the device of FIG. 1 with a detached brush head.

Turning now to the exemplary embodiment depicted in the Figures, a skin treatment device 1 is depicted in FIGS. 1 and 2, wherein FIG. 1 shows the skin treatment device 1 with a brush head 2 attached to a shaver handle housing 3, whereas the brush head 2 is a detached from the shaver handle housing 3 in FIG. 2.

The shaver handle housing 3 is an outer shell in the form of a handle encasing not shown component parts, like an energy source, e.g. a rechargeable battery, a motor, a drive train, a control unit and the like. Such internal component parts may be connected to external component parts of the shaver handle housing 3, for example a switch 4 or drive pins 5 protruding from support 6 of the shaver handle housing 3. Although not depicted in detail in FIGS. 1 and 2, the support 6 may be mounted on the shaver handle housing 3 permitting a swiveling movement of the support 6 with respect to the lower portion of the shaver handle housing 3, for example swiveling to the left and to the right in FIGS. 1 and 2, and/or permitting a tilting movement of the support 6 with respect to the lower portion of the shaver handle housing 3, for example tilting back and forth about brush head pivot axis I in FIGS. 1 and 2.

Figure 4:
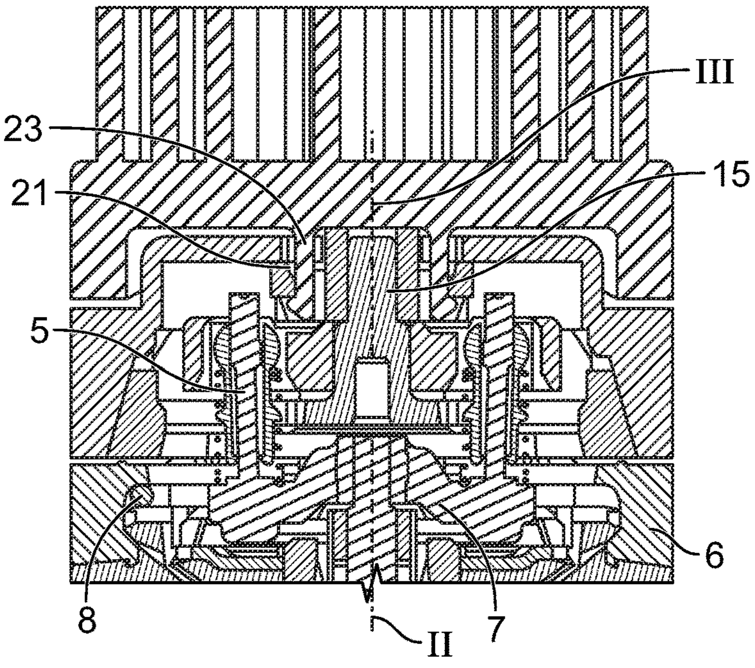
FIG. 4 shows in a schematic sectional view a portion of the device of FIG. 1.

In the embodiment depicted in FIGS. 1 and 2, the drive pins 5 are located on a bridge 7 with each drive pin 5 having the identical distance to an oscillation axis II defined by a shaft of the drive train (see FIG. 4).

The support 6 of the shaver handle housing 3 is designed to receive in a detachable manner a cartridge with one or more haircutting units, for example with a foil-type upper cutter and a lower cutter comprising several blades which are driven by the drive pins 5. The support 6 may comprise an interface permitting attachment of such a cartridge, wherein the interface comprises for example a spring element 8 designed to interact with hooks (not shown) of such a cartridge (see FIGS. 4, 13, 14). After removal of the cartridge brush head 2 may be attached to the support 6 in the same manner A brush 9 is detachably mounted on the brush head 2. In the depicted embodiment, the brush 9 has a substantially circular configuration with several bundles of bristles facing away from the side of the shaver handle housing 3.

Figure 3:
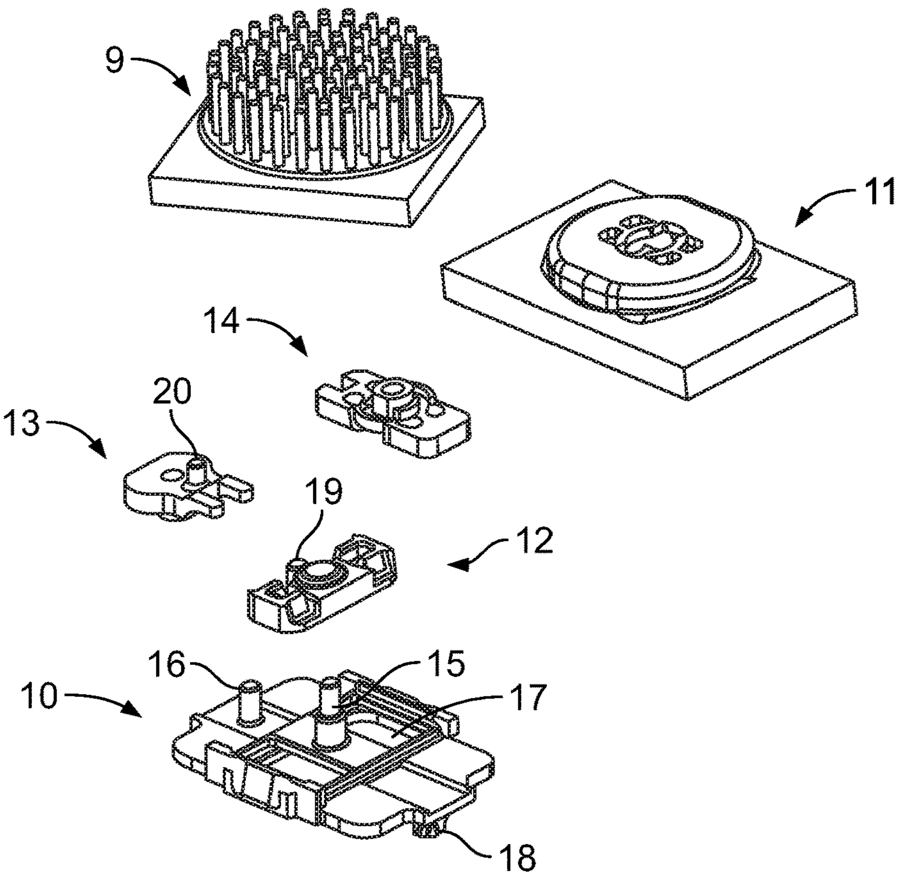
FIG. 3 shows in a schematic exploded view the component parts of the brush head of the device of FIG. 1.
Figure 13:
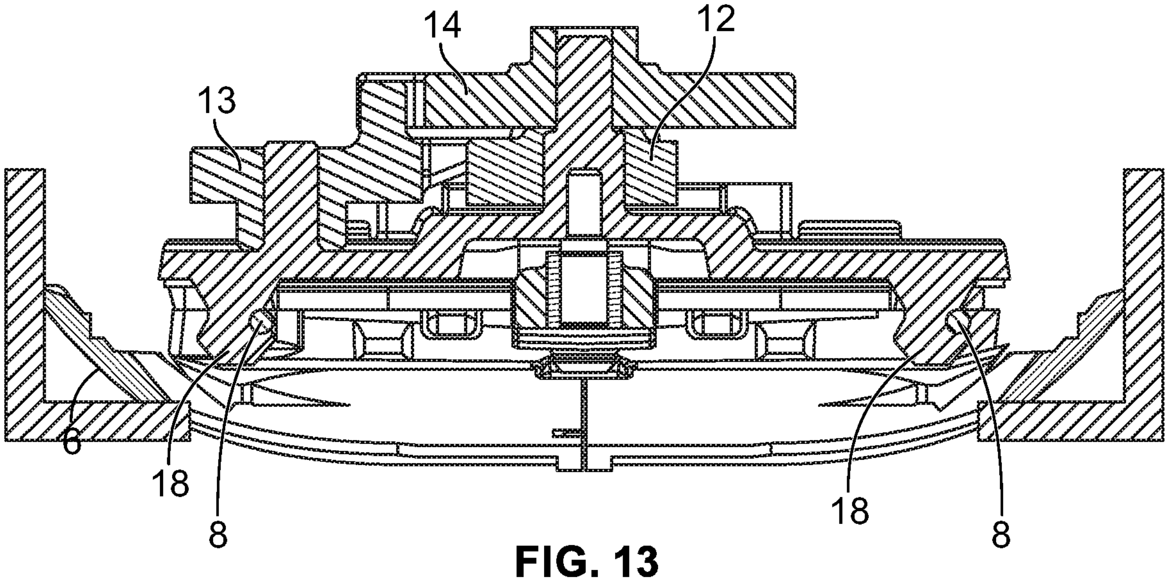
FIG. 13 shows in a further schematic sectional view components of the brush head of the device of FIG. 1.
Figure 14:
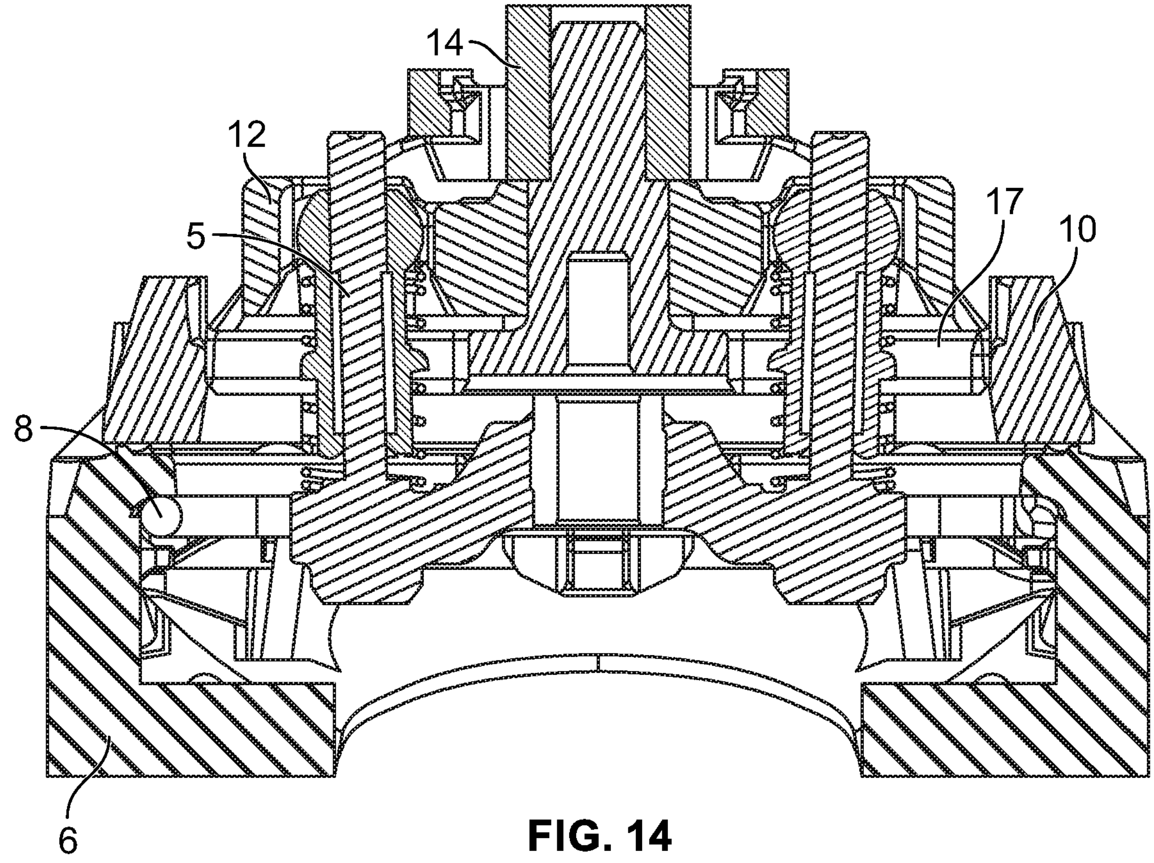
FIG. 14 shows in a further schematic sectional view components of the brush head of the device of FIG. 1.

The component parts of the brush head 2 are depicted in FIG. 3. In this embodiment, the brush head 2 comprises a frame 10, a hood 11, a driving lever 12, a connection lever 13 and a brush lever 14, wherein the frame 10 and the levers 12, 13, 14 form a gearing mechanism. FIGS. 4, 5 and 7 to 15 depicted in more detail the arrangement of the component parts of the brush head 2. The frame 10 and the hood 11 are connected with each other to form a rigid unit permitting attachment and detachment with respect to the shaver handle housing 3. The frame 10 is provided with a first stud 15 and a second stud 16 which are parallel to each other and offset from each other. The first stud 15 defines a brush axis III which is identical with the oscillation axis II (see FIG. 4). The frame 10 further comprises two openings 17 through which the drive pins 5 extend when the brush head 2 is mounted on the shaver handle housing 3. Further, two hooks 18 protrude from the frame 10 in a direction opposite to the extension of the studs 15, 16, i.e. the lower side in FIG. 3. As shown in FIG. 13, the frame 10 may interact with the spring element 8 of the support 6 for retaining of the shaver head 2 on the shaver handle housing 3.

The driving lever 12 has a central opening receiving the first stud 15. Further, the driving lever 12 has two arms each having an opening for receiving a respective drive pin 5 as shown for example in FIGS. 4 and 14. In other words, when the motor in the shaver handle housing 3 is activated, bridge 7 performs a rotatory oscillating movement together with the drive pins 5 which is transmitted to driving lever 12 oscillating about oscillation axis II and brush axis III. The driving lever 12 further comprises a pin 19 which is offset from the first stud 15 but closer to the first stud 15 compared with the openings receiving the drive pins 5.

The connection lever 13 comprises an opening receiving the second stud 16. Further, connection lever 13 has an arm extending away from the second stud 16 which has a recess pivotably receiving pin 19 of the driving lever 12 and which has a further pin 20 facing away from the frame 10, i.e. the upper side in FIG. 3. The pin 20 is located closer to the second stud 16 compared with the recess receiving pin 19.

The brush lever 14 comprises a central opening receiving the first stud 15. Further, brush lever 14 comprises an arm with a recess pivotably receiving pin 20 of the connection lever 13. In addition, brush lever 14 comprises two first openings 21 having an undercut and four second openings 22 (see FIG. 11).

Due to the arrangement of the levers 12, 13, 14 and the pins 19, 20 and the respective recesses for receiving the drive pins 5 and the pins 19, 20, the rotatory oscillating movement of the bridge 7 and the drive pins 5 is translated to a rotatory oscillating movement of the brush lever 14 with the same speed but with a smaller amplitude. In the example depicted in the Figures, the transmission ratio for the amplitude is between 1/15 to 7/15, resulting in an amplitude in a range between ±1° and ±3.5° of the brush lever 14.

Figure 5:
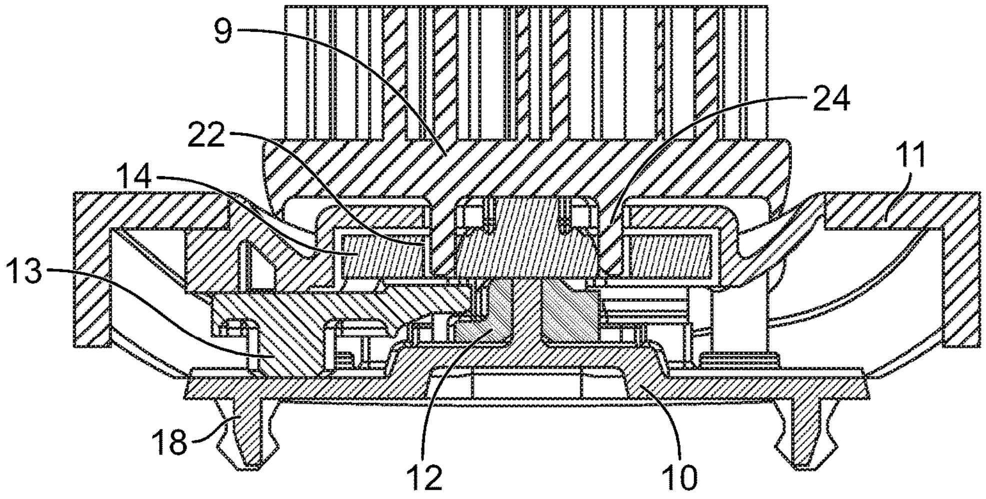
FIG. 5 shows in a further schematic sectional view a portion of the device of FIG. 1.
Figure 15:
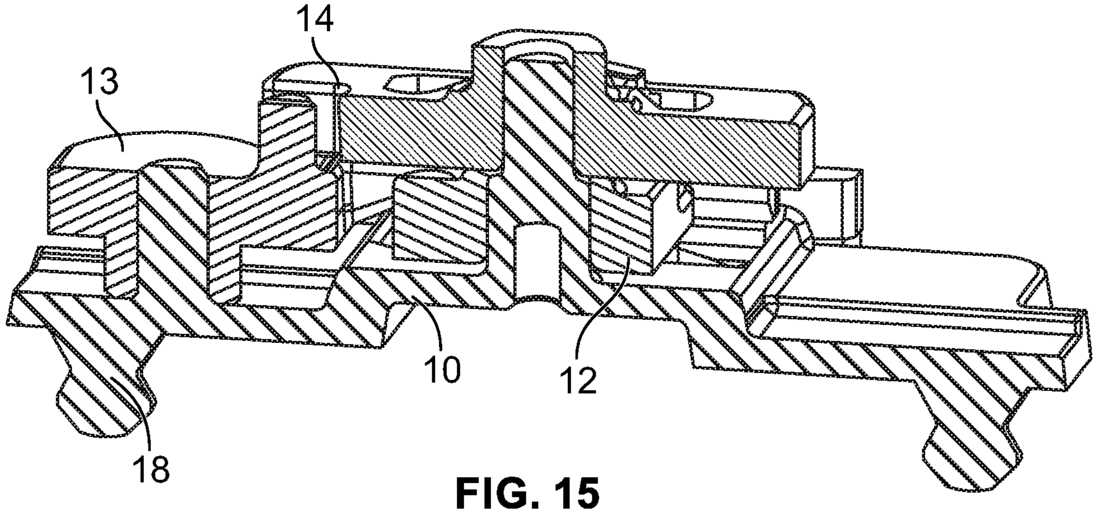
FIG. 15 shows in a further schematic sectional view components of the brush head of the device of FIG. 1.

As can be taken for example from FIG. 5, 13 or 15, the frame 10 and the levers 12, 13, 14 are relatively flat and the levers are partially arranged next to each other resulting in a brush head 2 which is relatively small in the direction of the oscillating axis II, i.e. in height. Due to the direct contact of the levers 12, 13, 14 with each other and with the drive pins, respectively, torque exerted by the drive pins 5 is directly transmitted to the brush lever 14.

Figure 6:
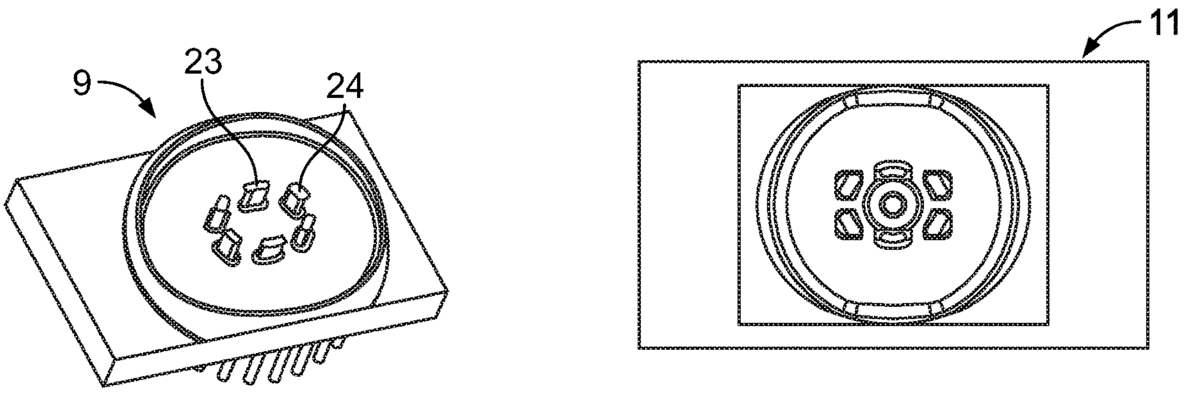
FIG. 6 shows in a schematic top view the brush head of the device of FIG. 1 with a detached brush.
Figure 7:
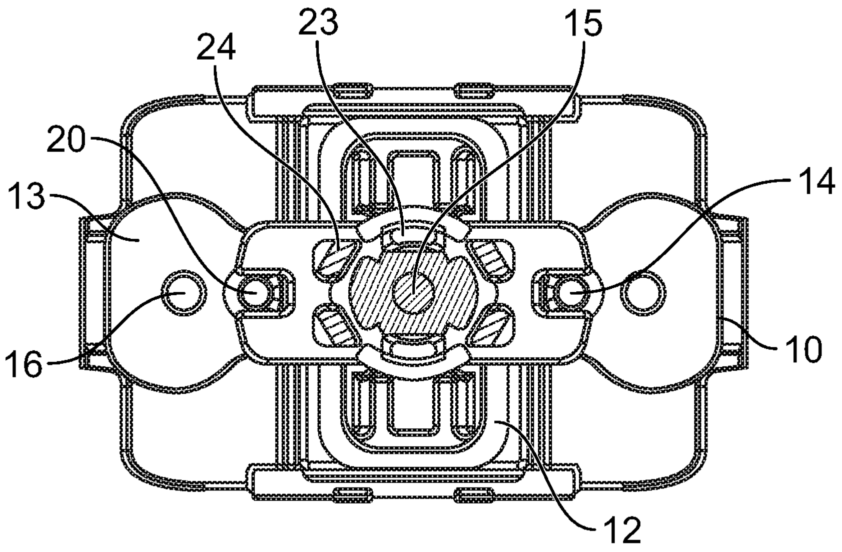
FIG. 7 shows in a schematic sectional view the brush head of the device of FIG. 1.

As can be taken from FIG. 6 the hood 11 of the brush head 2 has the central opening and four additional openings mating and aligned with the openings 21 and 22 of the brush lever 14. With the exception of these openings, the hood 11 is substantially closed thereby preventing that dirt or the like enters the gearing mechanism.

The brush 9 comprises two snap elements 23 and four lugs 24 on the opposite side of the brush 9 having the bristles, i.e. on the lower side in FIG. 3. The snap elements 23 and the lugs 24 are aligned and mating with the openings 21 and 22 of the brush lever 14 and with the respective openings in the hood 11.

Figure 8:
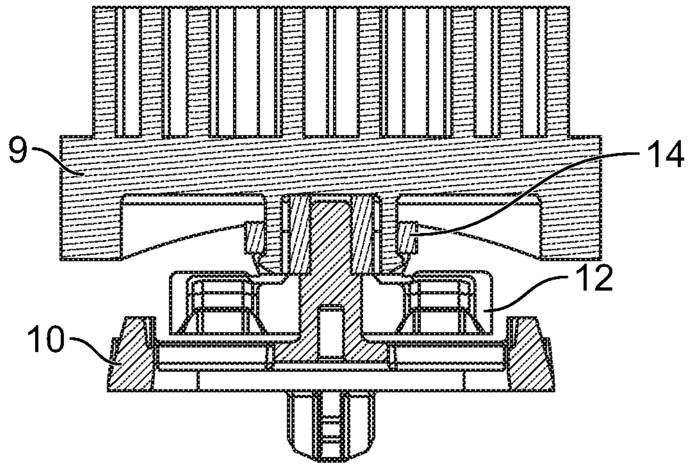
FIG. 8 shows in a further schematic sectional view components of the brush head of the device of FIG. 1.
Figure 10:
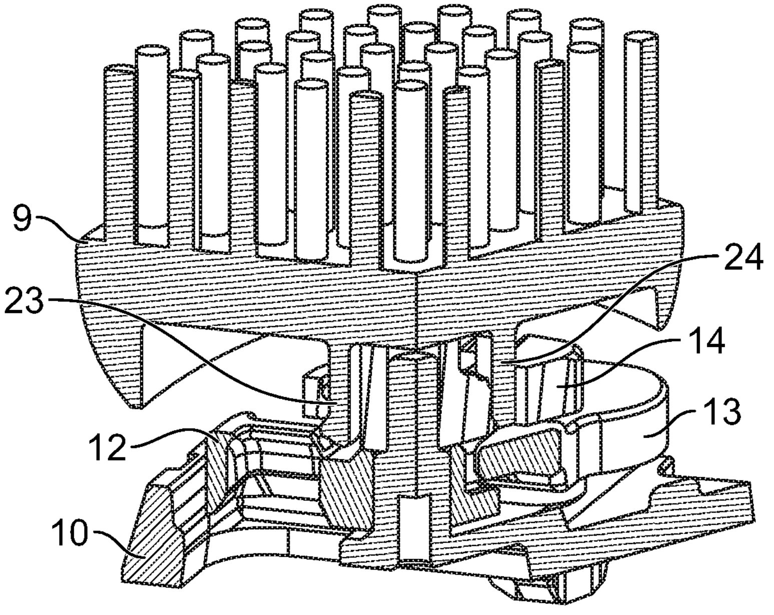
FIG. 10 shows in a further schematic sectional view components of the brush head of the device of FIG. 1.
Figure 11:
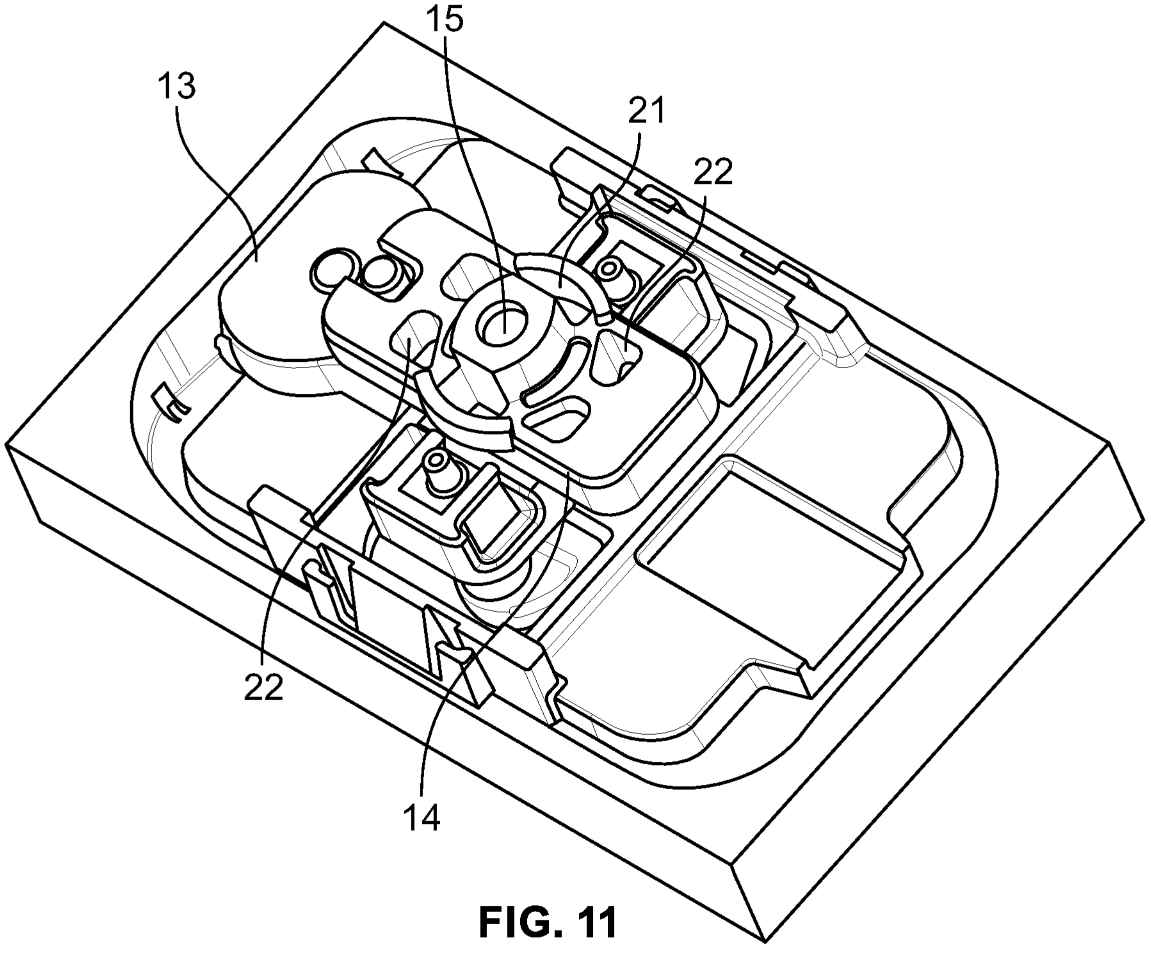
FIG. 11 shows in a further schematic perspective view components of the brush head of the device of FIG. 1.
Figure 12:
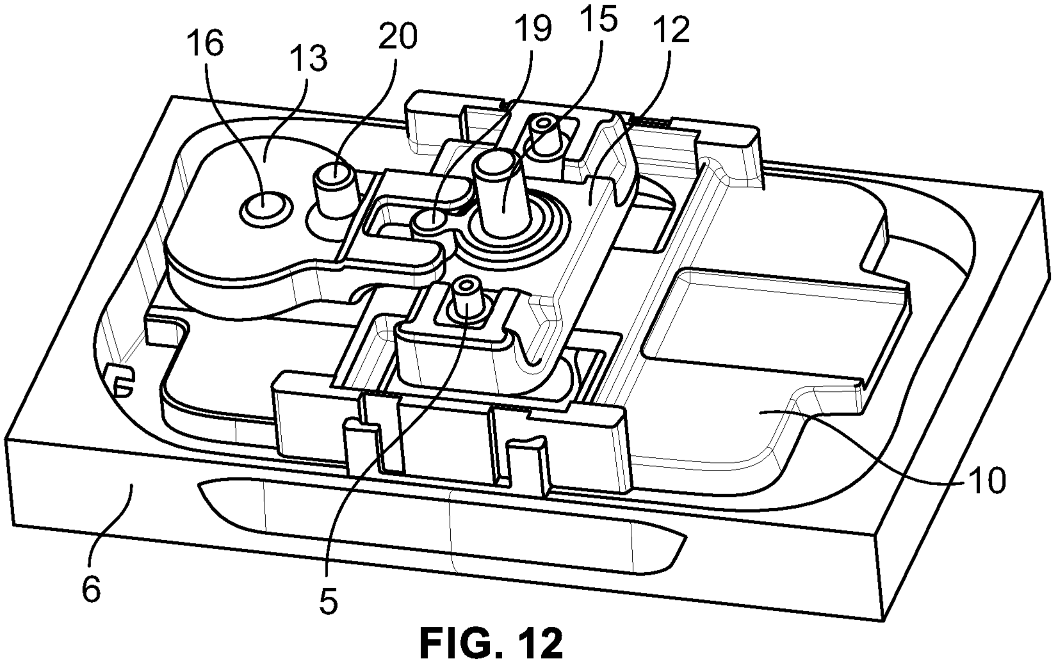
FIG. 12 shows in a further schematic perspective view components of the brush head of the device of FIG. 1.

As can be seen in FIGS. 4, 8 and 10, the snap elements 23 protrude through the central opening in the hood 11 and are snapped into the undercuts of the openings 21 in the brush lever 14, thereby axially constraining the brush 9 on the brush lever 14 of the brush head 2. However, due to the arched design of the openings 21, the snap elements 23 do not significantly transmit torque from the brush lever 14 to the brush 9. In addition, the openings 21 are wider than the width of the snap elements 23, thereby allowing lateral displacement of the snap elements 23 in the respective openings 21. The respective opening in the hood 11 is wider than the width of the snap elements 23, too, thereby allowing rotation of the brush 9 with its snap elements 23 relative to the hood 21.

Figure 9:
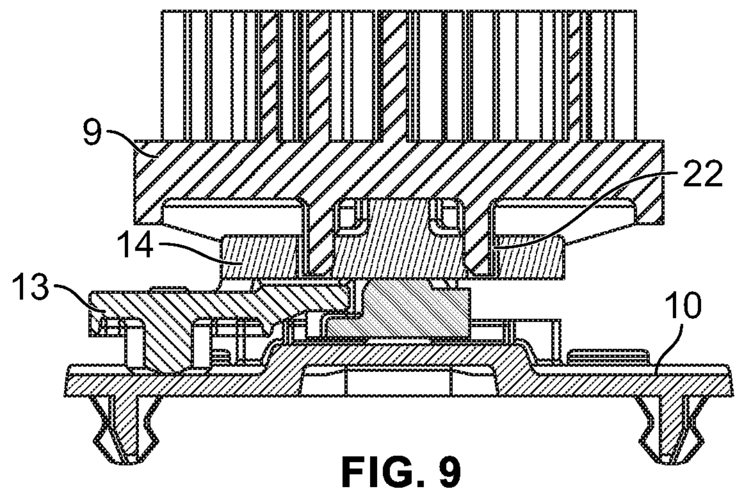
FIG. 9 shows in a further schematic sectional view components of the brush head of the device of FIG. 1.

On the other hand, as can be seen in FIGS. 5, 9 and 10, the lugs 24 protrude through the respective openings in the hood 11 and are press fit into the openings 22 in the brush lever 14. Again, the respective openings in the hood 11 are wider than the width of the lugs 24, thereby allowing rotation of the brush 9 with its lugs 24 relative to the hood 21. Thus, while the lugs 24 do not significantly retain the rush 9 on the brush lever 14 in the axial direction, torque is transmitted from the brush lever 14 to the brush 9 by means of the press fit between the lugs 24 and the openings 22.

In other words, the function of axially constraining the brush 9 on the brush head 2 and the function of transmitting torque to the brush 9 are achieved by different features, namely the interaction of snap elements 23 with openings 21 and interaction of lugs 24 with openings 22.

In the depicted embodiment the lugs 24 are arranged substantially concentrically with respect to the brush axis III. However, other configurations are suitable for transmitting torque to the brush 9, too. Further, while the provision of several lugs 24 may be beneficial in reducing play between the brush lever 14 and the brush 9 by slightly prestressing the lugs 24 and the openings 22, it may be sufficient to provide only one lug 24 for transmitting torque from the brush lever 14 to the brush 9. Further, the outer shape of the lugs 24 is not limited to the depicted substantially rectangular shape. As an alternative, the lugs 24 may be cylindrical.

In the exemplary embodiment depicted in the Figures, the hood 11 is provided with a substantially cylindrical plateau, while the side facing away from the bristles of the brush 9 is provided with a cylindrical skirt receiving this plateau when the brush 9 is attached to the brush head 2. This design further contributes in preventing that dirt or the like enters the gearing mechanism and/or the interface between the brush head 2 and the shaver handle housing 3.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

REFERENCE NUMERALS

1 skin treatment device
2 brush head
3 shaver handle housing
4 switch
5 drive pin
6 support
7 bridge
8 spring element
9 brush
10 frame
11 hood
12 driving lever
13 connection lever
14 brush lever
15 first stud
16 second stud
17 opening
18 hook
19 pin
20 pin
21 first opening
22 second opening
23 snap element
24 lug
I brush head pivot axis
II oscillation axis
III brush axis

What is claimed is:

1. A brush head comprising a brush and an interface for detachably attaching the brush to a skin treatment device, wherein the brush head comprises a component part driven by a drive unit of the skin treatment device to perform a rotatory and/or oscillating movement and a hood encasing the driven component part, wherein the brush comprises protrusions which extend through openings in the hood when the brush is attached to the skin treatment device, and wherein the protrusions comprise two snap elements for attaching the brush to the driven component part by snap fit and at least two lugs for engaging the driven component part by press fit, wherein the two snap elements and the at least two lugs are disposed about a rotary axis (III) of the brush, the two snap elements being located closer to the rotary axis (III) of the brush than the at least two lugs.

2. The brush head according to claim 1, wherein the brush head comprises a gearing mechanism with at least one rotatable lever which is the driven component part for engagement with the at least two lugs and the two snap elements.

3. The skin treatment device according to claim 1, wherein the at least two lugs comprise four lugs.

4. A skin treatment device, comprising:

a shaver handle housing, a detachable brush head pivotably supported by the shaver handle housing about at least one brush head pivot axis (I), and a gearing mechanism, wherein the shaver handle housing comprises a drive unit for driving at least one drive pin in a rotatory oscillating manner with a first amplitude about an oscillation axis (II) which is at least substantially perpendicular to the at least one brush head pivot axis (I), wherein the brush head comprises a brush rotatable about a brush axis (III) which is at least substantially perpendicular to the at least one brush head pivot axis (I), wherein the brush is attached to a rotatable lever of the gearing mechanism of the skin treatment device, wherein the brush head further comprises a hood encasing the gearing mechanism, wherein the brush comprises at least two protrusions which both extend through openings in the hood when the brush is attached to the skin treatment device, and wherein the at least two protrusions comprise at least one lug and at least one snap element, and wherein the at least one lug engages the rotatable lever part by press fit and the at least one snap element engages the rotatable lever by snap fit when the brush is attached to the skin treatment device.

5. The skin treatment device according to claim 4, wherein the at least one lug and the at least one snap element of the brush are coupled to the at least one drive pin by means of the gearing mechanism, wherein the gearing mechanism translates a rotatory oscillating movement of the drive pin into a rotatory oscillating movement of the at least one lug and the at least one snap element with a second amplitude which is smaller than the first amplitude of the drive pin.

6. The skin treatment device according to claim 5, wherein the second amplitude is smaller than the first amplitude by a factor x, wherein x is between about 2 and about 15.

7. The skin treatment device according to claim 6, wherein x is between about 3 and about 8.

8. The skin treatment device according to claim 4, wherein the first amplitude is in a range between about +5° and about +10°.

9. The skin treatment device according to claim 4, wherein the brush axis (III) and the oscillation axis (II) are parallel to each other.

10. The skin treatment device according to claim 9, wherein the brush axis (III) and the oscillation axis (II) are identical with each other.

11. The skin treatment device according to claim 4, wherein the gearing mechanism comprises a frame, a driving lever pivotably engaging the at least one drive pin, a connection lever pivotably engaging the driving lever, and a brush lever pivotably engaging the connection lever and engaging the drive unit, wherein the driving lever, the connection lever, and the brush lever are supported on the frame.

12. The skin treatment device according to claim 11, wherein the frame comprises at least one opening with the at least one drive pin extending through the opening and/or at least one hook for attaching the frame on the shaver handle housing.

13. The skin treatment device according to claim 11, wherein the frame comprises a first stud and a second stud which is offset from the first stud, wherein the driving lever and the brush lever are supported on the first stud, and wherein the connection lever is supported on the second stud.

14. The skin treatment device according to claim 11, comprising two drive pins mounted on a bridge oscillating about the oscillation axis (II), wherein drive pins are located with the same distance from the oscillation axis (II) on the bridge, and wherein the driving lever pivotably engages both drive pins.

15. The skin treatment device according to claim 11, wherein the hood encases the driving lever, the connection lever, the brush lever, and the frame.

16. The skin treatment device according to claim 4, wherein the gearing mechanism is detachably constrained to the shaver handle housing.

* * * * *